(12) United States Patent
Bakalash

(10) Patent No.: US 12,151,166 B2
(45) Date of Patent: *Nov. 26, 2024

(54) INTEGRATED REALITY GAMIFIED APPLICATIONS

(71) Applicant: Reuven Bakalash, Shdema (IL)

(72) Inventor: Reuven Bakalash, Shdema (IL)

(*) Notice: Subject to any disclaimer, the term of this patent is extended or adjusted under 35 U.S.C. 154(b) by 0 days.

This patent is subject to a terminal disclaimer.

(21) Appl. No.: 18/222,698

(22) Filed: Jul. 17, 2023

(65) Prior Publication Data

US 2024/0050854 A1 Feb. 15, 2024

Related U.S. Application Data

(60) Provisional application No. 63/396,246, filed on Aug. 9, 2022.

(51) Int. Cl.
| | |
|---|---|
| *A63F 13/65* | (2014.01) |
| *A63F 13/213* | (2014.01) |
| *A63F 13/70* | (2014.01) |
| *G06T 19/00* | (2011.01) |

(52) U.S. Cl.
CPC ............ *A63F 13/65* (2014.09); *A63F 13/213* (2014.09); *A63F 13/70* (2014.09); *G06T 19/006* (2013.01); *A63F 2300/8082* (2013.01)

(58) Field of Classification Search
CPC ........ A63F 13/65; A63F 13/70; A63F 13/213; A63F 13/63; A63F 13/655; A63F 13/533; A63F 13/5375; A63F 13/577; A63F 2300/8082; A63F 2009/246; A63F 2250/287; A63F 2300/6018; A63F 2300/69; G06T 19/006

See application file for complete search history.

(56) References Cited

U.S. PATENT DOCUMENTS

| | | | | |
|---|---|---|---|---|
| 7,596,473 | B2 * | 9/2009 | Hansen | G06Q 10/06 446/85 |
| 7,755,620 | B2 * | 7/2010 | Scherer | G06T 19/00 345/157 |
| 9,409,084 | B2 * | 8/2016 | Horovitz | A63F 13/655 |
| 9,595,108 | B2 * | 3/2017 | Horovitz | G06V 20/647 |
| 9,821,242 | B2 * | 11/2017 | Muthyala | A63H 33/06 |
| 9,827,507 | B2 * | 11/2017 | Muthyala | A63H 33/042 |
| 10,089,772 | B2 * | 10/2018 | Taylor | A63F 13/213 |
| 10,220,326 | B2 * | 3/2019 | Anderson | A63H 33/26 |
| 10,583,354 | B2 * | 3/2020 | Muthyala | A63H 33/042 |
| 11,083,968 | B2 * | 8/2021 | Walker | A63F 13/213 |
| 11,331,577 | B2 | 5/2022 | Kai | |
| 11,369,864 | B2 | 6/2022 | Zuniga et al. | |

(Continued)

OTHER PUBLICATIONS

Legos with ARKit2 (with commentary). WWDC Keynote 2018. YouTube video. TWIT Tech Podcast Network. Jun. 4, 2018. <https://www.youtube.com/watch?v=JwSIKwuT8VI> (Year: 2018).*

(Continued)

*Primary Examiner* — William H McCulloch, Jr.

(74) *Attorney, Agent, or Firm* — May Patents Ltd. c/o Do

(57) ABSTRACT

The present invention integrates physical reality components and digital reality components in a single integrated reality gamified application. A game development platform assisted by Artificial Intelligence turns legacy construction games into virtual reality playgrounds for imaginative and insightful gamified applications.

14 Claims, 16 Drawing Sheets

(56) References Cited

U.S. PATENT DOCUMENTS

| | | | |
|---|---|---|---|
| 11,376,493 B2 | 7/2022 | Mullen | |
| 11,393,153 B2* | 7/2022 | Yan | G06V 20/20 |
| 11,433,310 B2* | 9/2022 | Walker | A63F 13/63 |
| 11,472,112 B2* | 10/2022 | Momose | B33Y 10/00 |
| 11,478,708 B1* | 10/2022 | Holm | A63F 13/577 |
| 11,583,774 B2* | 2/2023 | Døssing | A63H 33/086 |
| 11,617,954 B2 | 4/2023 | Pedersen et al. | |
| 11,623,146 B2 | 4/2023 | Rispoli et al. | |
| 11,625,990 B2 | 4/2023 | Nakamura | |
| 11,626,030 B2 | 4/2023 | Lee et al. | |
| 11,755,111 B2* | 9/2023 | Nickerson | G06F 3/016 |
| | | | 345/156 |
| 2005/0128212 A1* | 6/2005 | Edecker | G06T 17/05 |
| | | | 345/581 |
| 2007/0063997 A1* | 3/2007 | Scherer | G06F 3/04845 |
| | | | 345/419 |
| 2011/0298922 A1* | 12/2011 | Horovitz | A63F 13/63 |
| | | | 382/165 |
| 2014/0378023 A1* | 12/2014 | Muthyala | A63H 33/042 |
| | | | 446/91 |
| 2015/0058229 A1* | 2/2015 | Wiacek | G06F 21/10 |
| | | | 705/310 |
| 2016/0253843 A1* | 9/2016 | Lee | G06T 19/006 |
| | | | 345/633 |
| 2017/0189797 A1* | 7/2017 | Muthyala | A63F 13/655 |
| 2017/0304732 A1* | 10/2017 | Velic | G06F 18/28 |
| 2018/0085682 A1* | 3/2018 | Anderson | A63H 33/22 |
| 2018/0264365 A1* | 9/2018 | Soederberg | A63F 13/98 |
| 2019/0089760 A1* | 3/2019 | Zhang | H04L 65/70 |
| 2019/0138785 A1* | 5/2019 | Olsen | A63F 13/213 |
| 2019/0240581 A1* | 8/2019 | Walker | A63F 13/533 |
| 2020/0341538 A1* | 10/2020 | Zhu | G06T 17/10 |
| 2021/0074052 A1* | 3/2021 | Ha | G06T 15/005 |
| 2021/0121782 A1* | 4/2021 | Døssing | A63F 13/65 |
| 2021/0187389 A1* | 6/2021 | Hansen | A63F 13/42 |
| 2021/0375025 A1* | 12/2021 | Yan | G06V 10/757 |
| 2022/0096947 A1* | 3/2022 | Schou | A63H 33/086 |
| 2022/0323865 A1* | 10/2022 | Holm | A63F 13/5375 |
| 2023/0056381 A1 | 2/2023 | Masuda et al. | |
| 2023/0056829 A1* | 2/2023 | Holm | A63F 13/577 |
| 2023/0065252 A1* | 3/2023 | Døssing | A63F 13/65 |
| 2023/0104313 A1 | 4/2023 | Lucey et al. | |
| 2023/0107385 A1 | 4/2023 | Salik | |
| 2023/0115723 A1 | 4/2023 | Suneja et al. | |
| 2023/0154115 A1* | 5/2023 | Jung | G06T 19/006 |
| | | | 345/633 |
| 2023/0158405 A1* | 5/2023 | Holm | A63F 13/5375 |
| | | | 463/31 |
| 2024/0165520 A1* | 5/2024 | Bakalash | A63F 13/655 |

OTHER PUBLICATIONS

Ramel, David. Apple Boosts iOS Augmented Reality Development with ARKit 2. ADTMAG. Jun. 5, 2018. < https://adtmag.com/articles/2018/06/05/arkit-2.aspx> (Year: 2018).*

Zhou, B., et al., A 10 million Image Database for Scene Recognition, 2017 (14 pages).

Jinsung Kim and Jin-Kook Lee, Stochastic Detection of Interior Design Styles Using a Deep-Learning Model for Reference Images, 2020 (20 pages).

Eva Millan et al. Using machine learning techniques for architectural design tracking: An experimental study of the design of a shelter. Journal of Building Eng. 51 (2022) (18 pages).

Kato, D.; Hattori, K.; Iwai, S.; Morita, M. (2012). "Effects of collaborative expression using LEGO® blocks, on social skills and trust". Social Behavior and Personality. 40 (7) (4 pages).

LEGO® BuildaMOC accessed from https://buildamoc.com/ downloaded on Jul. 2023 (4 pages).

"The Little Prince" narration by Kenneth Branagh accessed from https://www.youtube.com/watch?v=APG1upS8LDw downloaded on Jul. 2023 (printscreen 1 page).

IMD-Intern. Institute for Management Development (2017). Lego in the age of digitization (A) (20 pages).

IMD-Intern. Institute for Management Development (2017). Lego in the age of digitization (B) (4 pages).

Discovery Education © 2005. The Art of the Sistine Chapel, Lesson Plan. (5 pages).

Video Games, Digital Play, and the Future of the LEGO Group. https://padandpixel.com/video-games-digital-play-and-the-future-of-the-lego-group/ 2021 (21 pages).

Sebastian Santasarkka, The Digital Games Industry and its Direct and Indirect Impact on the Economy. Case study: Supercell and Finland. Helsinki Metropolia University of Applied Sciences, 2017 (42 pages).

* cited by examiner

INTEGRATED REALITY GAMIFIED APPLICATIONS

CROSS-REFERENCE TO RELATED CASES

The present application claims priority based on U.S. Provisional Application No. 63/396,246 filed Aug. 9, 2022, entitled: "Constructible combined reality games", which is incorporated hereby by reference.

FIELD OF THE DISCLOSURE

The present invention integrates physical reality and digital reality in a single gamified application.

BACKGROUND

Integrated Reality. The postmillennial generation of kids, born in the Internet era, take the Internet and related digital networks and tools for granted; technology and online activities are incorporated into everything. As one of the young put it, "For me, online and offline are one and the same, basically the same thing, integrated" (R. Katz, S. Ogilvie, J. Saw, L. Woodhead; Gen Z, Explained. The Art of Living in a Digital Age. Chicago Univ. Press, 2021). Post-millennial generations (Gen Z) are distinguishable from their elders, including the pre-Internet generation usually called millennials or Gen Y, precisely because they have never known life without the Internet. Computer gaming became a key component of the online activities of Gen Z. From 2000 to the present (the Online Boom) was the rise of the internet and mobile, which grew the computer gaming industry from tens of billions to hundreds of billions in revenue. The tidal wave of digital gaming has only continued to swell and become a key factor of the Integrated Reality concept.

However, some of the pre-internet generations of legacy games, such as the plastic bricks construction game of LEGO®, remain an independent and necessary mainstay of full-reality gaming. Jorgen Vig Knudstorp, the LEGO® CEO, has compared LEGO® to books: "Just as children still want to read books, they still want to have the physical LEGO® experience that cannot be replaced by digital play."

Therefore, for the future generations, born into the dual world of physical and digital reality, there is a great need to bridge the pre-internet legacy games and digital gaming worlds, by way of Integrated Reality (IR).

Gamification is a technology that incorporates elements of gameplay in non-game situations. It is used to engage customers, students, and users in the accomplishment of quotidian tasks with rewards and other motivators. Gamification is using game design elements in non-game contexts, such as education, and others. The use of educational games as learning tools is a promising approach due to their ability to teach and reinforce knowledge and important skills such as problem-solving, collaboration, and communication. Games have remarkable motivational power; they utilize several mechanisms to encourage people to engage with them, often without any reward, just for the joy of playing and the possibility to win. As opposed to using elaborate games requiring a large amount of design and development efforts, the educational gamification approach suggests using game thinking and game design elements to improve learners' engagement and motivation.

Educational Games are games explicitly designed for educational purposes or have incidental or secondary educational value. Educational games are games that are designed to help transmit knowledge or foster skills and character traits. Game types include board, card, bricks, video games, AR, and VR.

Artificial Intelligence for architectural and interior design. Machine Learning (ML) algorithms, as a subfield of Artificial Intelligence, build a model based on sample data, known as training data, to make decisions or designs without being explicitly programmed. Some implementations of machine learning use data and neural networks in a way that mimics the working of a biological brain.

Generative adversarial networks (GANs) are used to generate 2D and 3D designs. GANs technologies are used to generate designs based on different architectural styles. The GANs-based method is used to produce unforeseen interior architectural designs that may or may not have arisen for human architects. GANs may require significant computational resources and time, but they may be affordable for architects without coding experience.

In the architectural and interior design domain, researchers have proposed AI approaches for the recognition of design-related information in images. Zhou, B., et al. [Places: A 10 million Image Database for Scene Recognition, 2017], which is incorporated hereby by reference, constructed a large image database of outdoor and indoor locations for machine learning and provided the source code and weights for a model trained on their database. Their database contains approximately 10 million images representing more than 400 space categories Kim, J. and Lee, J.-K [Stochastic Detection of Interior Design Styles Using a Deep-Learning Model for Reference Images 2020], which is incorporated hereby by reference, used deep learning to explore interior design trends in different regions. Moreover, Kim, J. and Lee, J.-K., [Stochastic Detection of Interior Design Styles Using a Deep-Learning Model for Reference Images, 2020], which is incorporated hereby by reference implemented auto-recognition of room usage in indoor images of apartments in South Korea as a component of an intelligent management system for interior reference images. Kim, J. and Lee, J.-K. [Stochastic Detection of Interior Design Styles Using a Deep-Learning Model for Reference Images, 2020] developed an interior design using a deep-learning model for reference images.

SUMMARY OF THE DISCLOSURE

The present invention integrates the worlds of physical reality and digital reality, termed Integrated Reality, in a single gamified application. Both worlds share the same gaming environment, objectives, and context. A toy-sized construction, playfully built by the gamer, becomes the core of a digital gaming environment, extending his creation into an imaginative and insightful gaming experience, blending the real and fictive worlds.

Physical reality is focusing on the strength of timeless brick technology, free of digital technology and its influences. The toy-sized model, built of bricks, is chosen according to the objectives of a gamified application (such as the world's famous buildings, temples, museums, and cultural centers, or custom designed). The model of plastic bricks can be either purchased as an off-the-shelf kit or developed as a custom architectural model designed by the game developer. The physical constructing effort generates an intimate familiarity with the constructed model. Since the construction model comprises the exterior only, its interior is typically designed from scratch or reproduced from an original, as part of digital development, with the assistance of AI.

On top of the physical reality level, a digital reality level is developed, based on a development platform of the current invention. One embodiment of the platform has four development levels and is assisted by a database and an Artificial Intelligence agent, turning the physical reality model into a virtual reality gaming environment.

In gaming, after the physical construction of the brick model is completed, the player is exposed to a VR version of the model's exterior and interior, ready to play a gaming application on the construction's virtual playgrounds.

Various physical models can be paired with various digital realities, producing wide-ranging environments and visualizations, where physical and digital objects interact throughout the game.

In one aspect of the invention, a method for creating an integrated reality gamified application that integrates physical reality and digital reality, to be played by one or more players is disclosed. The method comprises providing a physical architectural model of interlocking components targeting the gamified application's objectives and developing a digital reality gamified application based on a photo-realistic view of the exterior and interior of the physical architectural model. The developing of the gamified application comprises comparing the characteristics of the physical architectural model with the requirements of the raw gamified application, creating or reproducing a virtual reality exterior, creating or reproducing the internal spaces and internal design according to the gamified application requirements, mapping the selected raw gamified application with the internal spaces and internal design and finalizing the creation of integrated reality gamified application by appending one or more game assets.

As appropriate, creating or reproducing a virtual reality exterior, internal spaces, and internal design according to the gamified application requirements using artificial intelligence.

As appropriate, providing the physical architectural model comprises building a physical architectural model using interlocking plastic brick components.

As appropriate, wherein the plastic brick components comprise LEGO® bricks.

As appropriate, wherein building of the physical architectural model is free of digital technology.

As appropriate, wherein building the physical architectural model using printed instructions or PDF files.

As appropriate, wherein finalizing the creation comprises appending the game assets including one or more of images, videos, riddles and clues, sound, music and animation.

According to another aspect of the invention, the method further comprising creating or reproducing a new virtual reality exterior and storing the exterior, corresponding to the physical architectural model in the database.

According to another aspect of the invention, the method further comprising retrieving a previously stored VR exterior of the physical architectural model if the model exists previously in the database.

As appropriate, wherein the new virtual reality exterior is created or reproduced using a set of attributes and photographs of the physical architectural model.

As appropriate, wherein creating or reproducing comprises predicting the exterior, internal spaces and interior design for the physical architectural model using artificial intelligence prediction functions.

According to yet another aspect of the invention, the method further comprises training the prediction functions using stored training data.

As appropriate, the method further comprises storing the created integrated reality gamified application in a database of complete integrated reality (IR) game applications.

According to a further aspect of the invention, a system for creating an integrated reality gamified application that integrates physical reality and digital reality, to be played by one or more players is disclosed. The system comprises a kit of interlocking components for a physical construction of an architectural model targeting the gamified application's objectives and a computing device configured for the development of integrated reality gamified application using the physical architectural model. The computing device comprises a digital database, which may comprise one or more of a list of physical models and virtual reality exteriors, a list of raw digital games, training data and prediction functions using AI algorithms for designing the exterior, the internal spaces, and interior design and a pool of complete integrated reality (IR) game applications. The system also comprises digital game development tools, wherein the game development tools are configured for the development of IR games based on the physical architectural model.

As appropriate, the game development tools are configured for creating a virtual reality photo-realistic view of the exterior and interior of the physical architectural model and creating the integrated reality gamified application played in the virtual interior of the physical architectural model.

As appropriate, the interlocking components comprises interlocking plastic brick components.

As appropriate, the interlocking plastic brick components comprise LEGO® bricks.

As appropriate, the kit further comprises printed instructions or PDF files which may assist in the construction of the physical architectural model.

As appropriate, the digital game development tools are configured to create the integrated reality gamified application by creating or reproducing a virtual reality exterior, creating or reproducing the internal spaces and internal design according to the gamified application requirements using artificial intelligence, mapping the selected raw gamified application with the internal spaces and internal design and finalizing the creation of integrated reality gamified application by appending one or more game assets.

As appropriate, the characteristics of the physical architectural model are compared with the designated raw gamified application to select the best match.

As appropriate, the digital game development tools are configured to create the new virtual reality exterior using a set of attributes and photographs of the physical architectural model.

As appropriate, wherein the pool of complete integrated reality (IR) game applications comprise ready-to-play games which can be played directly by a player after construction of the physical architectural model.

As appropriate, the artificial intelligence prediction functions are used to predict the exterior, internal spaces and interior design for the physical architectural model.

As appropriate, the training data is used to train the prediction functions.

BRIEF DESCRIPTION OF THE DRAWINGS

For a better understanding of the embodiments and to show how they may be carried into effect, reference will be made, purely by example, to the accompanying drawings.

With specific reference now to the drawings in detail, it is stressed that the particulars shown are by way of example and for purposes of illustrative discussion of selected embodiments only and are presented in the cause of providing what is believed to be the most useful and readily understood description of the principles and conceptual aspects. In this regard, no attempt is made to show structural details in more detail than is necessary for a fundamental understanding; the description taken with the drawings makes apparent to those skilled in the art how the several selected embodiments may be put into practice.

As used in this specification, the singular indefinite articles "a", "an", and the definite article "the" should be considered to include or otherwise cover both single and plural referents unless the content clearly dictates otherwise. In other words, these articles are applicable to one or more referents. As this specification uses, "or" is generally employed to include or otherwise cover "and/or" unless the content dictates otherwise.

As used in this specification, the term "gamified application" may include the terms "educational gamified application" or "game". The term "interior architecture" is the design of an interior for a given shell (exterior) of the building concerned. It refers to the design and plan used for a building's interior in architectural terms, to accommodate a gaming environment. The term "interior design" is the art of enhancing the interior of a building to achieve an appropriate environment for the gaming space, including conceptual development, space planning, and interior decoration.

Figure 1:
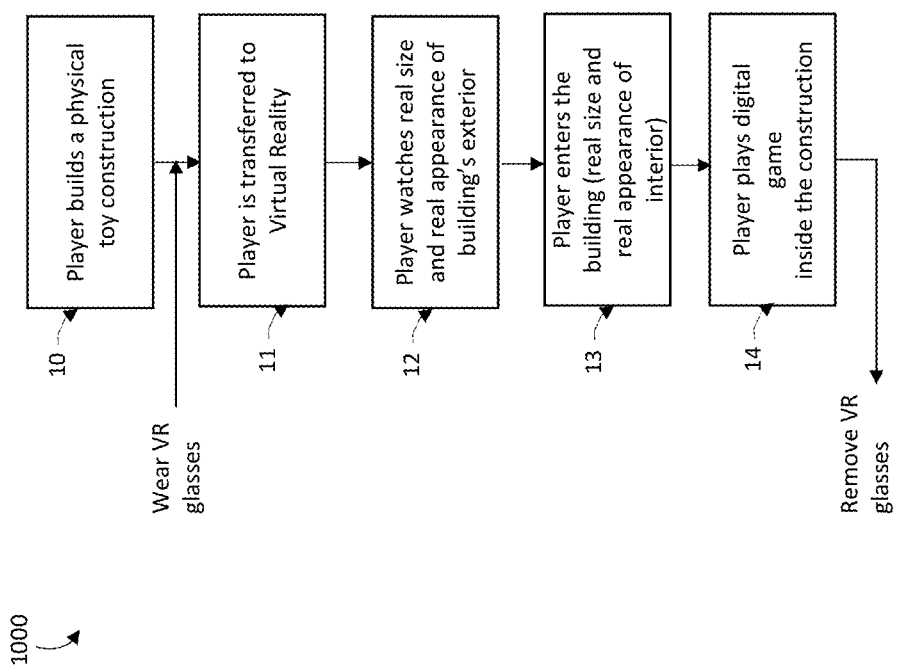
Figure 2A:
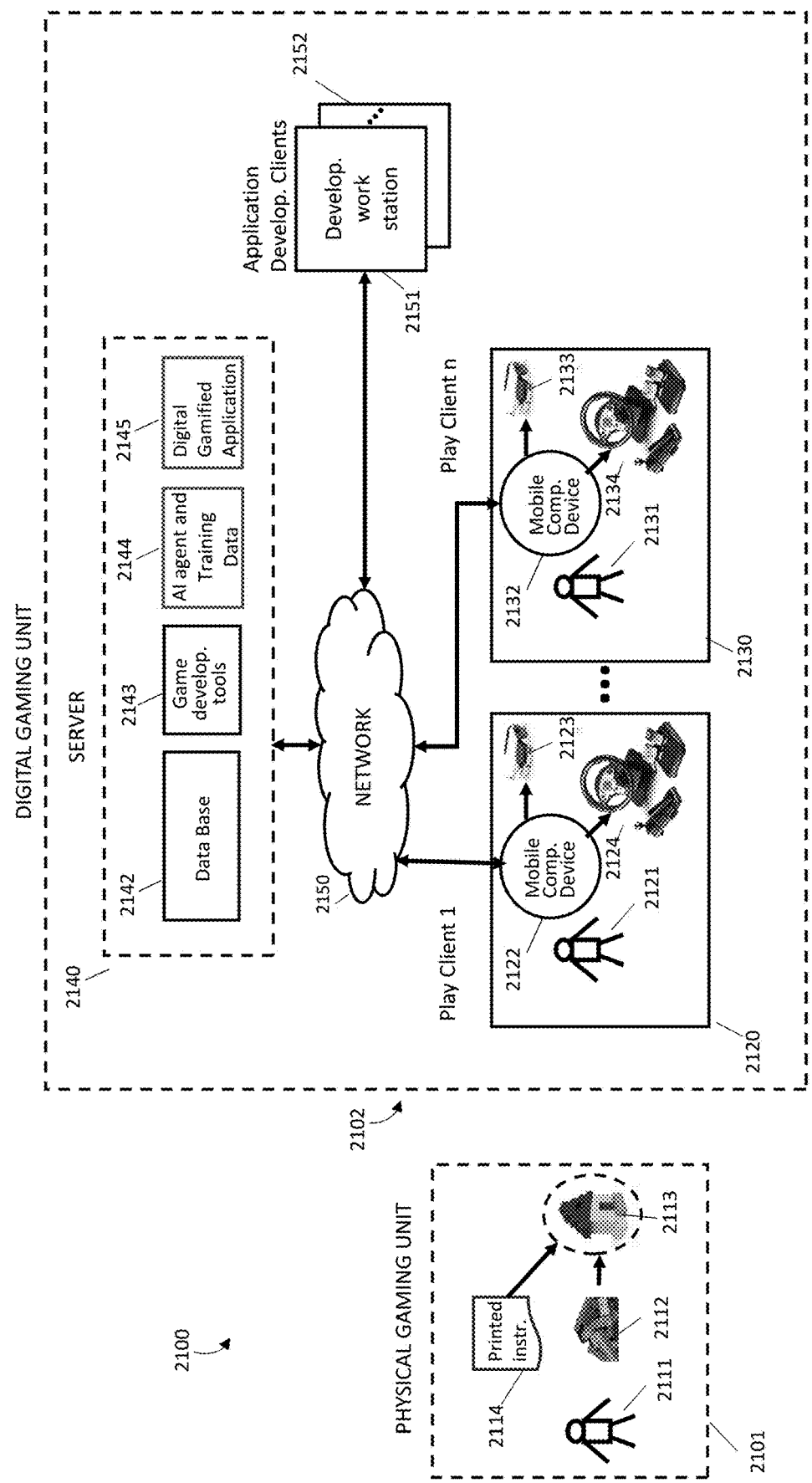
Figure 2B:
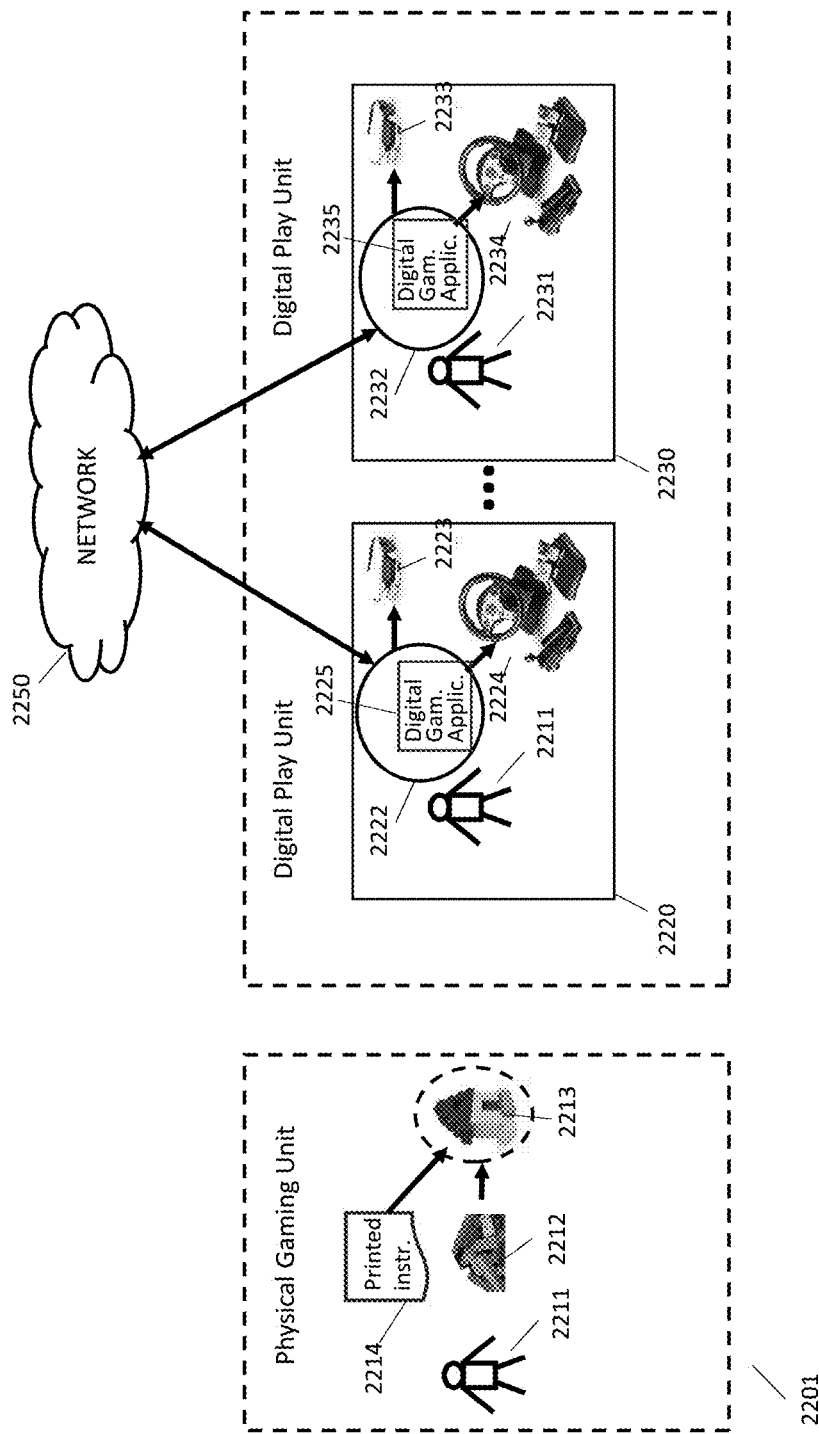
Figure 3A:
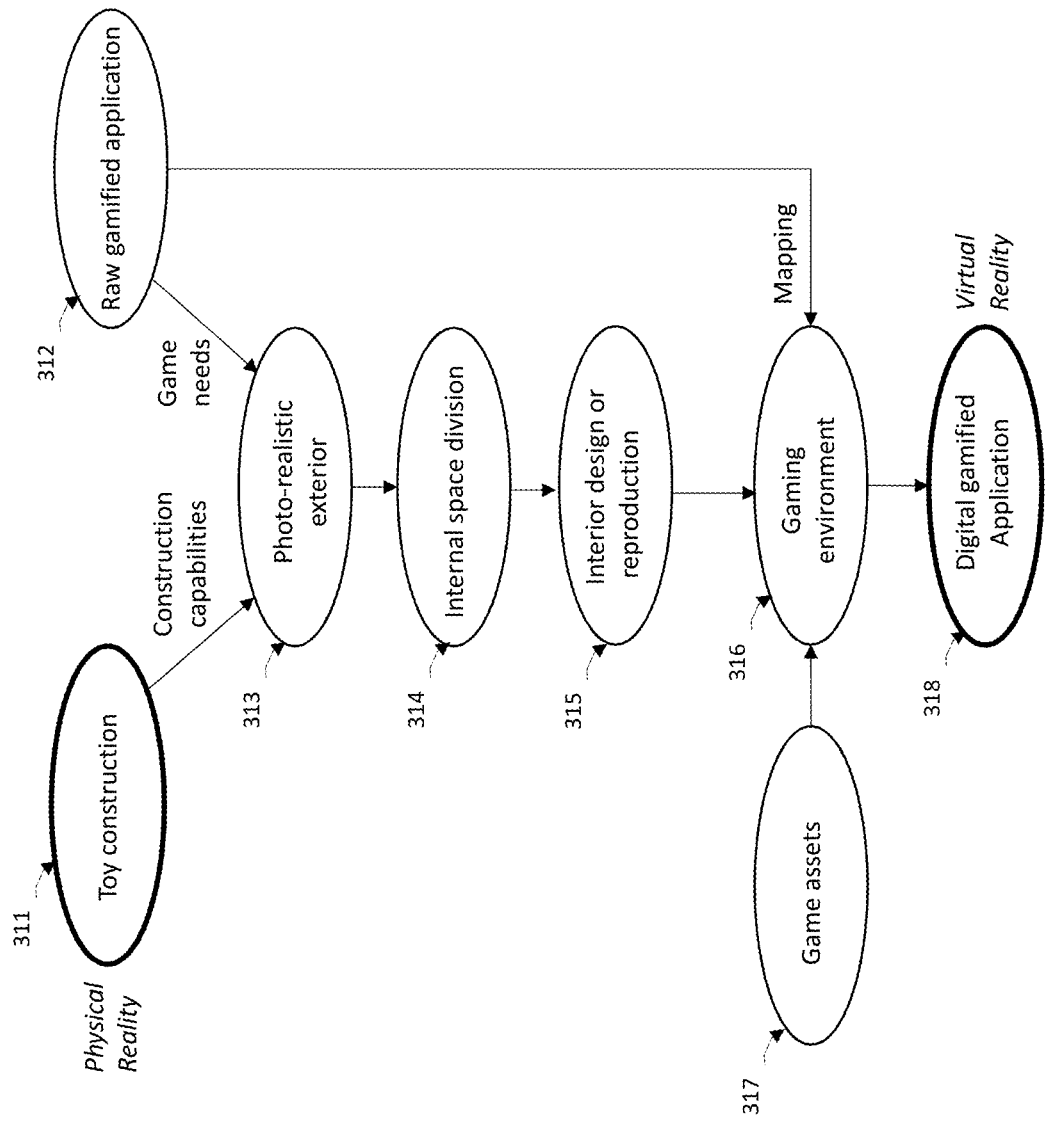
Figure 3B:
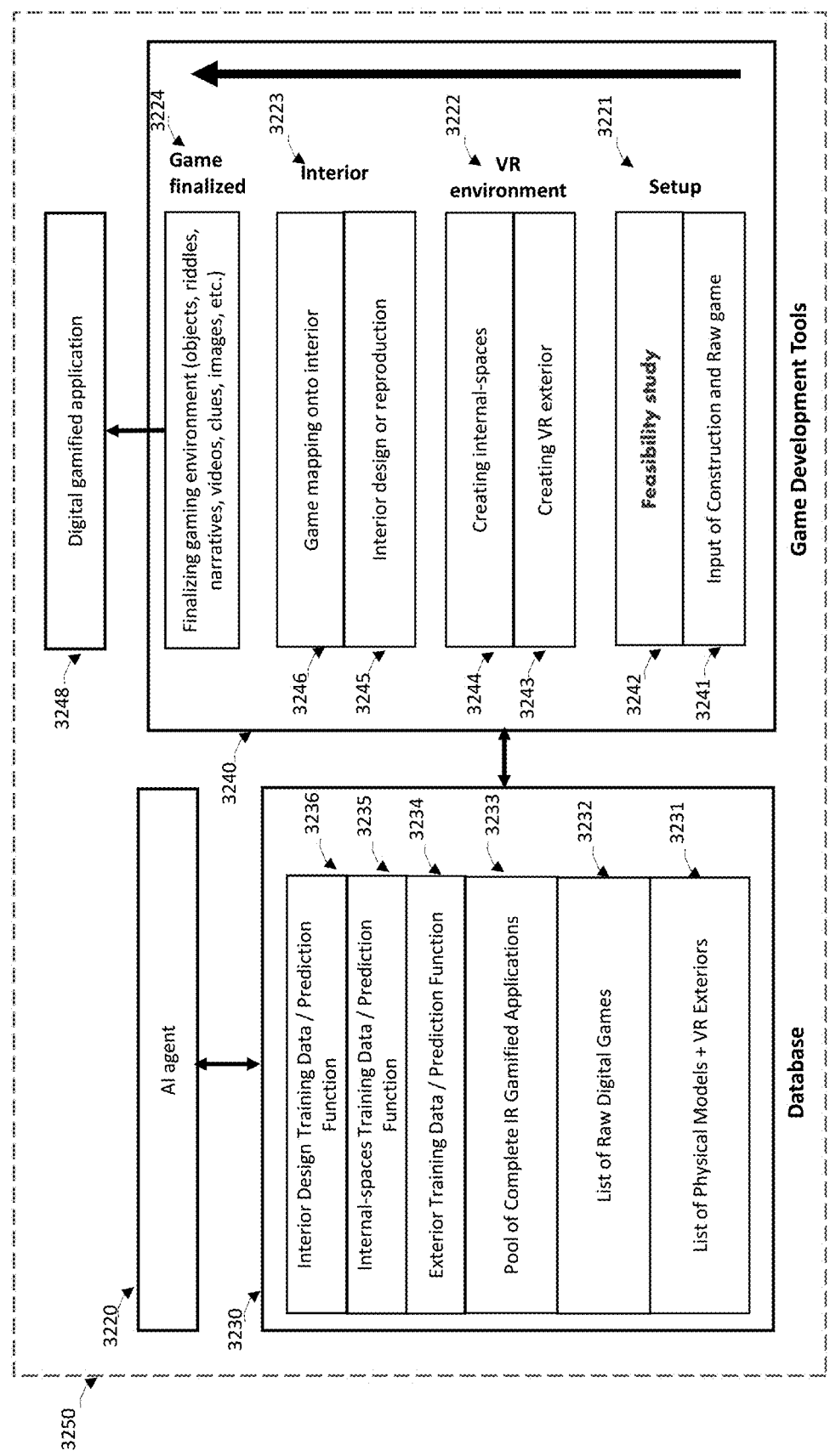
Figure 4:
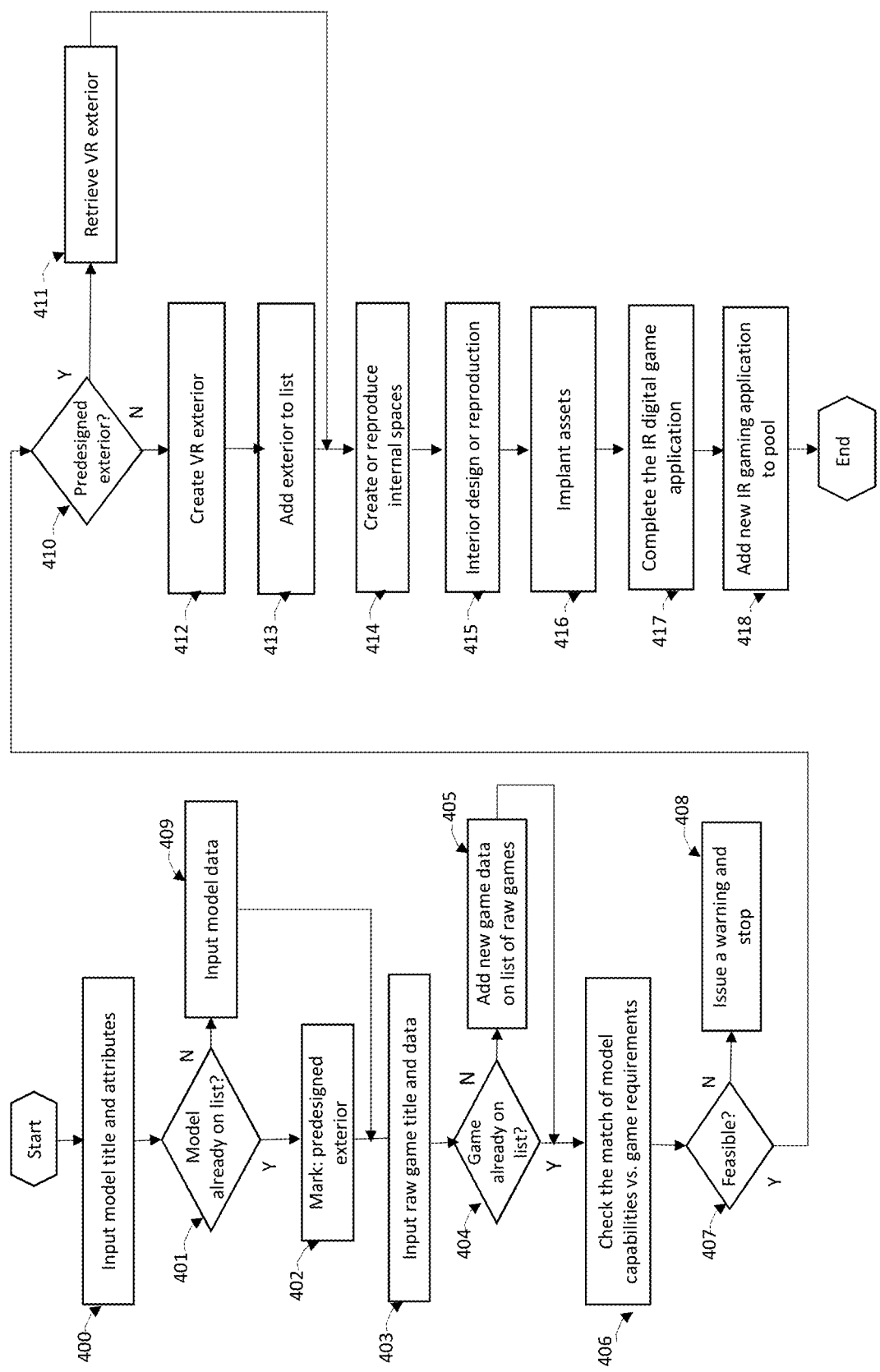
Figure 5C:
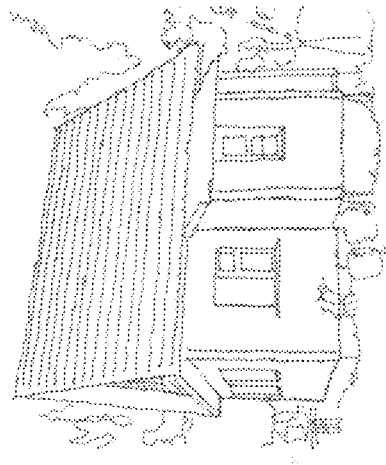
Figure 5B:
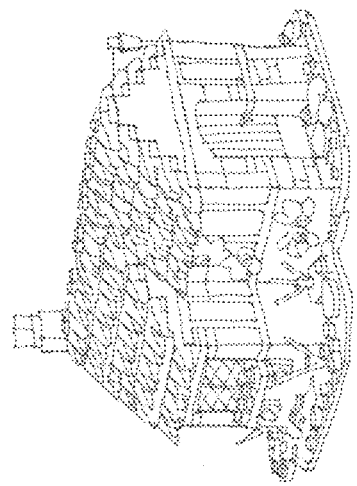
Figure 5A:
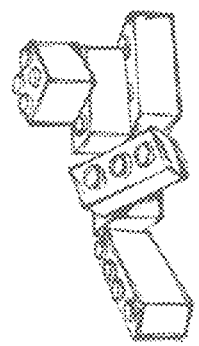
Figure 6A:
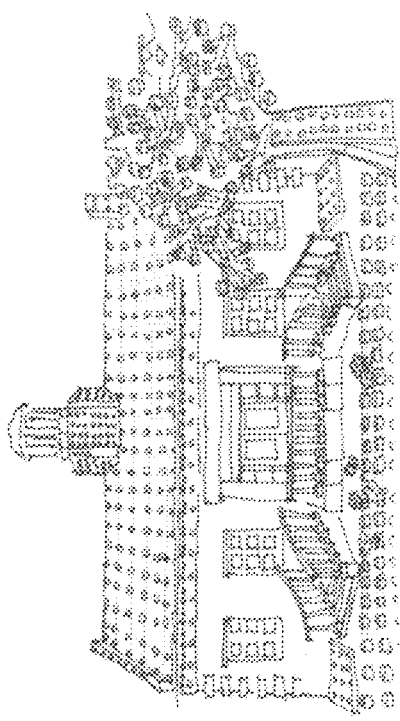
Figure 6B:
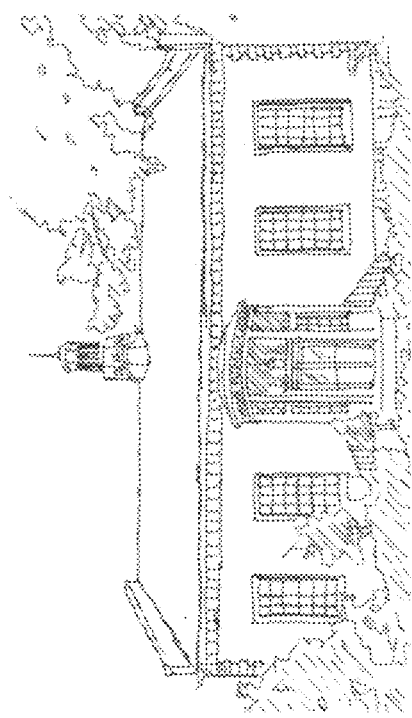
Figure 6D:
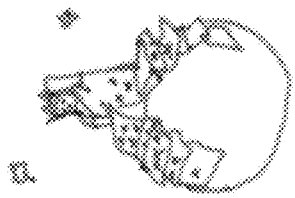
Figure 6C:
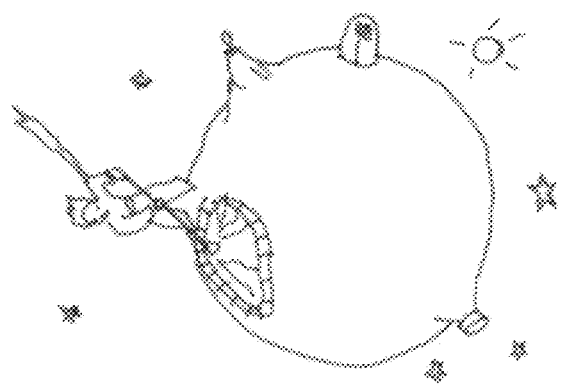
Figure 6F:
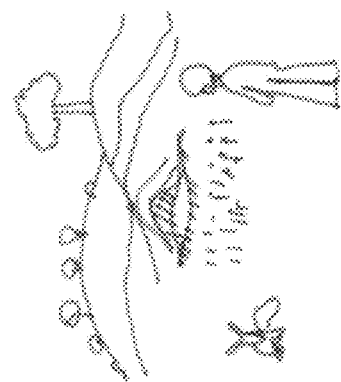
Figure 6E:
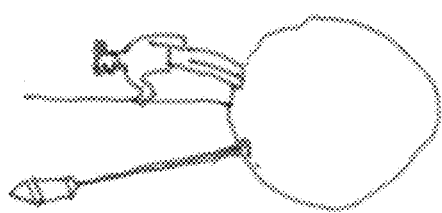
Figure 6G:
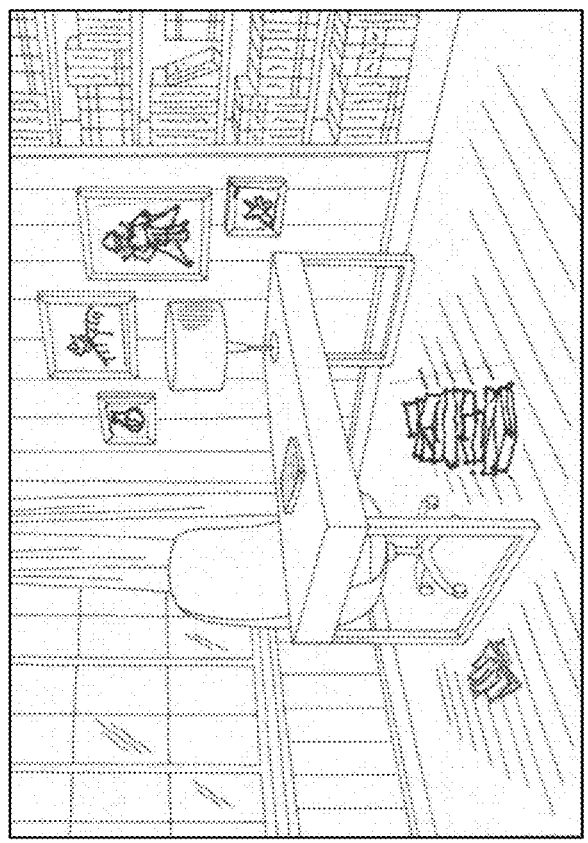
Figure 7B:
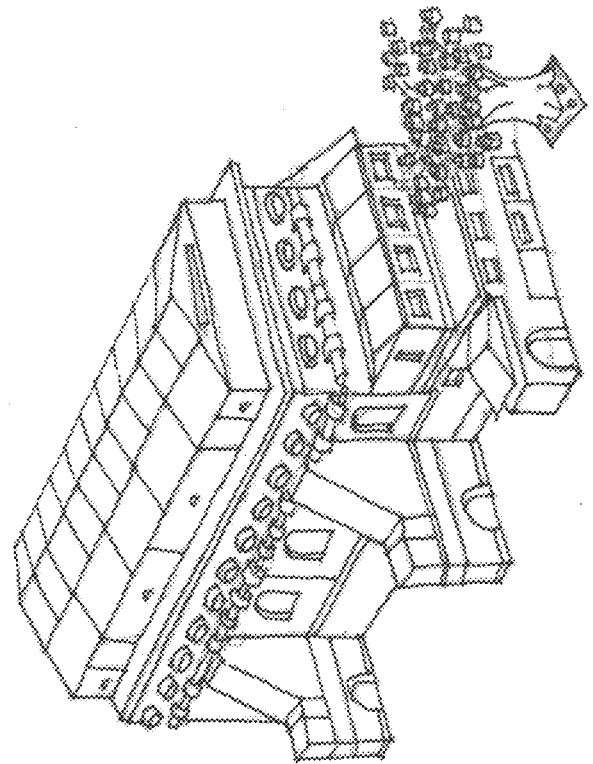
Figure 7A:
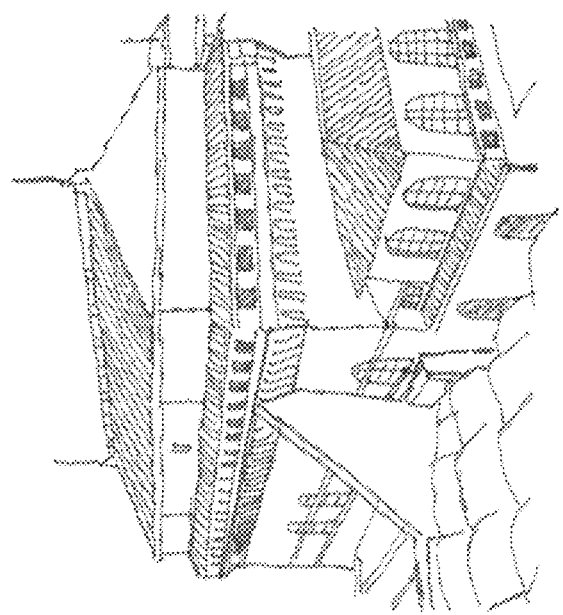
Figure 7D:
Figure 7C:
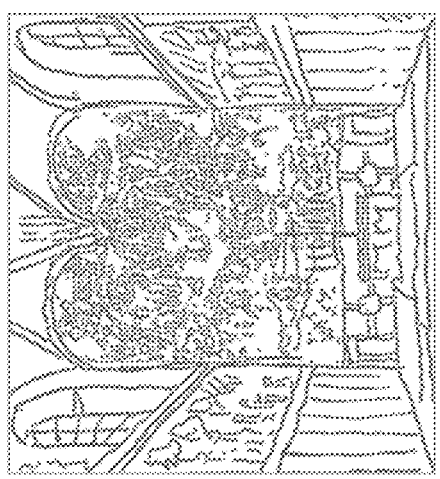
Figure 7F:
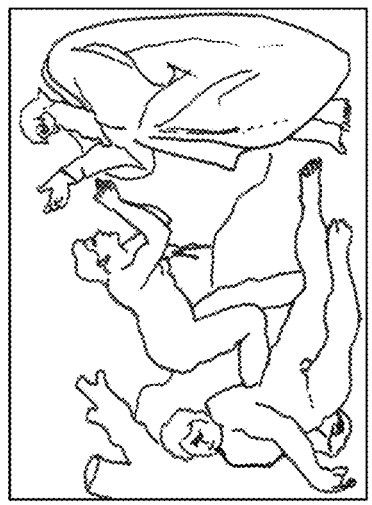
Figure 7E:
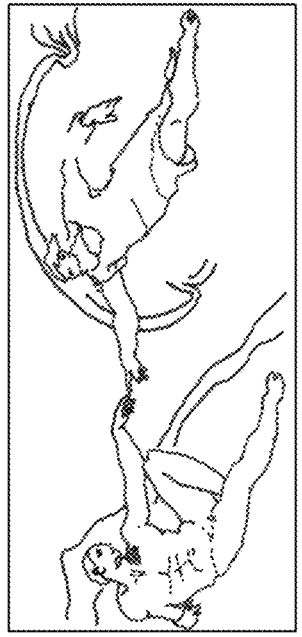
Figure 7G:
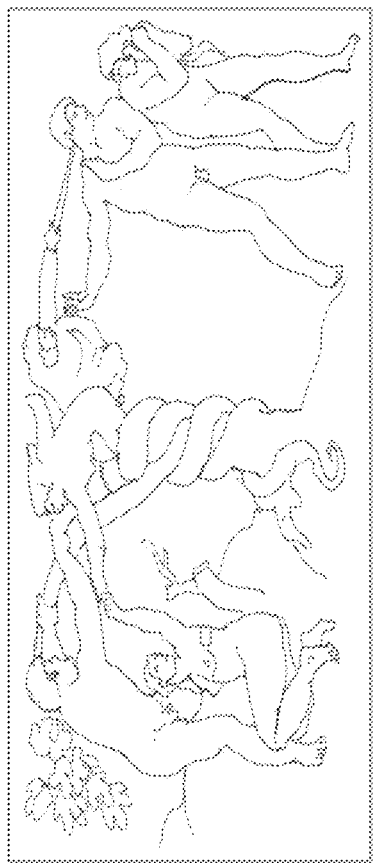
Figure 8:
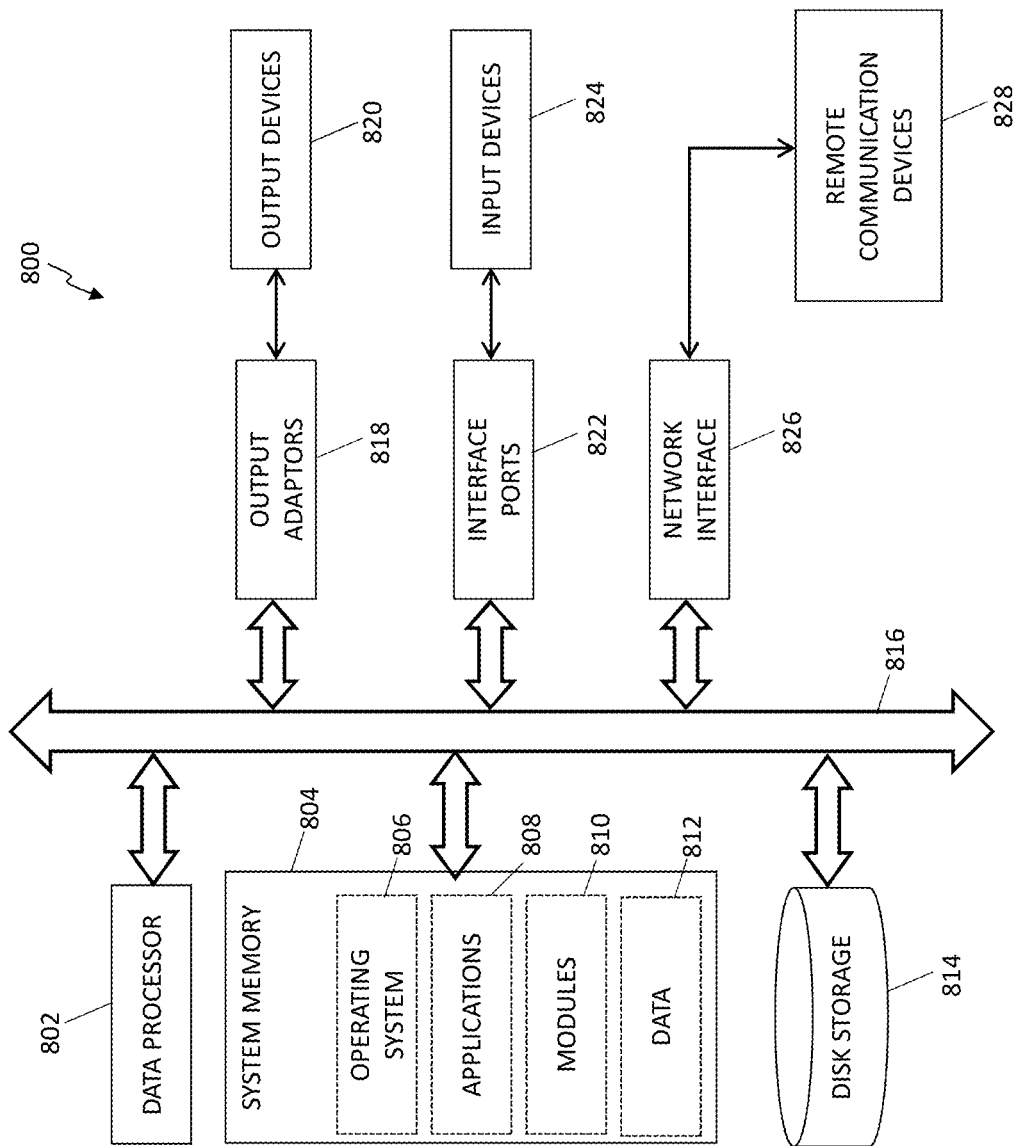

In the accompanying drawings:

FIG. 1. illustrates the gaming stages of an Integrated Reality game, played by a player in accordance with an exemplary embodiment of a present invention;

FIG. 2a. illustrates a schematic representation of a network-based gaming system of play and development, in accordance with an exemplary embodiment of a present invention;

FIG. 2b. illustrates a schematic representation of a physical and digital play units of an IR gaming system, detached from a server, in accordance with an exemplary embodiment of a present invention;

FIG. 3a. illustrates a flowchart of the development platform for Integrated Reality games, in accordance with an exemplary embodiment of a present invention;

FIG. 3b. illustrates a schematic structure of the development platform for Integrated Reality games, in accordance with an exemplary embodiment of a present invention;

FIG. 4. illustrates a flowchart of developing an IR game, in accordance with an exemplary embodiment of a present invention;

FIG. 5a. Illustrates plastic bricks utilized to construct a Hut building of the given example, in accordance with an exemplary embodiment of a present invention;

FIG. 5b. a toy structure of a plastic brick-made Hut in the first example case, constituting a game environment, in accordance with an exemplary embodiment of a present invention;

FIG. 5c. illustrates a Virtual Reality image of the Hut's exterior in the first example case, in accordance with an exemplary embodiment of a present invention;

FIG. 6a. illustrates a LEGO®-built replica of the public library in the second example case, in accordance with an exemplary embodiment of a present invention;

FIG. 6b. illustrates a photograph of the public library in the second example case, in accordance with an exemplary embodiment of a present invention;

FIG. 6c. illustrates the character of the Little Prince in the second example case, in accordance with an exemplary embodiment of a present invention;

FIG. 6d. illustrates the character of the King in the second example case, in accordance with an exemplary embodiment of a present invention;

FIG. 6e. illustrates the character of the Lamplighter in the second example case, in accordance with an exemplary embodiment of a present invention;

FIG. 6f. illustrates the character of the Fox in the second example case, in accordance with an exemplary embodiment of a present invention;

FIG. 6g. illustrates a VR interior image of an author's room in the second example case, in accordance with an exemplary embodiment of a present invention;

FIG. 7a. is a photograph of the Sistine Chapel in Rome, Italy;

FIG. 7b. illustrates a plastic-brick model of the Sistine Chapel, in accordance with an exemplary embodiment of a present invention;

FIG. 7c. illustrates a VR visibility of the decorated walls of the Sistine Chapel, in accordance with an exemplary embodiment of a present invention;

FIG. 7d. illustrates a VR visibility of the decorated ceiling of the Sistine Chapel, in accordance with an exemplary embodiment of a present invention;

FIG. 7e. illustrates a VR visibility of the Creation of Adam fresco at the Sistine Chapel, in accordance with an exemplary embodiment of a present invention;

FIG. 7f. illustrates a VR visibility of the Creation of Eve fresco at the Sistine Chapel, in accordance with an exemplary embodiment of a present invention;

FIG. 7g. illustrates a VR visibility of the Fall and Expulsion from the Garden of Eden fresco at the Sistine Chapel, in accordance with an exemplary embodiment of a present invention; and FIG. 8. Illustrates a block diagram of an exemplary system for implementing various aspects of the invention.

DETAILED DESCRIPTION OF THE DISCLOSURE

Embodiments are directed toward the integration of physical reality and digital reality worlds in gaming. In this context, physical reality refers to a physical place where the player must be there to see it, and everyone presents sees essentially the same thing. In contrast, digital reality refers to an environment created by computer software, where a player is remote from physical space but feels like he is in physical space. The player may also be able to see shared experiences with other players and/or see content unique to the individual.

Virtual reality (VR) is a simulated experience that employs pose tracking and 3D near-eye displays to give the user an immersive feel of a virtual world. Standard virtual reality systems uses either virtual reality headsets or multi-projected environments to generate some realistic images, sounds and other sensations that simulate a user's physical presence in a virtual environment. A person using virtual reality equipment is able to look around the artificial world, move around in it, and interact with virtual features or items. The effect is commonly created by VR headsets consisting of a head-mounted display with a small screen. Virtual reality typically incorporates auditory and video feedback.

Integrated Reality gaming consists of physical and digital levels. The first, the physical level, is focusing on the strength of timeless legacy brick technology, innovating within the core technology, and may have been free of digital gaming influences. It is a basic offline physical game, played in full reality. The second, digital gaming level, is added on top of the legacy level, after the core construction has been designed, created, or purchased. This level is based mainly on VR, but it may imply different additional categories of digital realities, all integrated with the basic offline physical gaming, producing wide-ranging environments and visualizations, where physical and digital objects interact throughout the game.

The toy construction built by the player (e.g., toy-sized building, car, airplane, boat, etc.), serves as a core fora fictive world of digital realities (virtual reality, video shows, video games, etc.). A computer-generated digital reality gamified application is played on a Virtual Reality playground modeled after the toy construction, built out of interlocking plastic bricks (e.g., LEGO® bricks). A set of such interlocking pieces can be assembled and connected in many ways to construct objects (including buildings, vehicles, spaceships, etc.).

Applying Integrated Reality gaming enables the gamer or a group to construct his own gaming environment in the physical world, and then extend his creation to an imaginative and insightful gaming experience, blending the real and fictive worlds.

According to some embodiments of the present invention the construction may be built out of a set of standardized brick pieces that allow for the construction of a variety of different models. The pieces avoid the lead time of requiring special training or design time to construct complex systems. This makes them suitable for temporary structures, or for use as children's toys. One very popular brand is LEGO®, however, other manufacturers are available as well, categorized according to pieces connection method and geometry.

Children benefit a lot from building plastic brick structures. Playing with LEGO® and other construction toys builds multiple physical skills. Manipulating the pieces helps to develop hand-eye coordination, training the eyes and hands to work together, bilateral integration—where the two sides of the body (or two hands) learn to work together, and develops visual-spatial ability.

Children who complete models using toy building blocks have much better spatial ability than children who do not complete such models. Toy construction play is also beneficial for autistic children when incorporating individual and/or group play with building blocks. Autistic children who played with building blocks were motivated to initiate social contact with children their age, able to maintain and endure contact with those children, and were also able to surpass the barriers of being withdrawn and highly structured. Construction toy play is beneficial for building social skills and building trust in others because it acts as a collaborative task where individuals have to cooperate to finish the task—building an object, for example Kato, D.; Hattori, K.; Iwai, S.; Morita, M. (2012). "*Effects of collaborative expression using LEGO® blocks, on social skills and trust*". *Social Behavior and Personality*. 40 (7), which is incorporated hereby by reference.

Digital Reality greatly boosts children's benefits and interests. It can enhance engagement, knowledge retention, learning outcomes, teamwork, social skills, and empathy. Virtual reality fully immerses students and completely focuses their senses on the teaching topic. When experiencing topics as if they are real, students' brains create clear, detailed mental maps, helping to improve knowledge retention.

To mark the difference between gaming media in this context: Physical Reality takes place completely in the physical place where the player must be there to see it, and everyone present sees essentially the same thing. Digital Reality takes place in a fictive world. Virtual Reality, a prominent sub-category of digital reality, can be referred to as a technology that allows for replacing the real world with a synthetic one, making the user believe that she/he is in another realm. It involves a set of technologies that are used to create computer-generated virtual environments where users can experience and interact just as they would in real life. The characteristics of VR make it a relevant technology for gaming purposes. The entertainment industry and research are full of examples involving VR applications. Gaming in VR is, however, not only restricted to entertainment but has been expanded to different fields, mainly with the purpose to learn or train through gaming, usually referred to as edutainment, educational gaming applications, or serious games. The video show is another sub-category of digital reality. It is a reproducible electronic medium for the recording, playback, and display of moving visual media. Interactive Film is another sub-category of digital reality. It is a video game or other interactive media that has characteristics of a cinematic film. In the video game industry, the term refers to a movie game, a video game that presents its gameplay in a cinematic, scripted manner, often through the use of full-motion video of either animated or live-action footage. In the film industry, the term "interactive film" refers to interactive cinema, a film where one or more viewers can interact with the film and influence the events that unfold in the film.

Reference now is made to FIG. 1, showing a block diagram 1000 of playing an Integrated Reality game, according to embodiments of the present invention. In the first physical stage 10, the player builds a model construction, such as a miniature house, museum, spaceship, car, airplane, boat, etc. Then during the digital stages 11-14, the constructed model is transformed into a virtual reality environment used as a playground in a gamified application.

Firstly, the player builds a physical model 10, out of plastic (or wooden) bricks, or other building pieces, such as wooden cubes, etc. Then, by wearing a virtual reality device such as VR glasses or a headset, the player is transferred to a Virtual Reality environment 11, visioning the physical model as a real size and a real-looking construction in the VR environment. The player firstly watches the exterior of the model 12, then enters the interior of it 13. When inside the model, the player can play a digital game involving various digital realities (virtual reality, video shows, video games, etc.) 14. In addition to the model-based interior, different virtual items (assets) can be added, such as video shows, riddles, clues, video game scenery, landscapes viewed from the construction's windows, etc. When the game is over, the player returns to reality by taking off the VR device. Three examples of integrated reality games are worked out in conjunction with FIGS. 5-7 which will be explained later.

Reference now is made to FIG. 2a, which presents a schematic representation of an Integrated Reality gaming system 2100, consisting of two subsystems, game development and game play, in which the systems and methods of the present invention may be implemented and executed. The IR gaming system is based on client-server architecture. A computing server is a piece of computer hardware or software that provides functionality for other programs or devices, called "clients". This architecture is called the client-server model. Servers can provide various functionalities, often called "services", such as sharing data or resources among multiple clients or performing computations for a client. A single server can serve multiple clients, and a single client can use multiple servers. A client process may run on the same device or may connect over a network to a server on a different device. FIG. 2a illustrates one or more servers 2140 communicating with one or more play client devices 2120-2130 or application development client devices 2151-2152 in a digital gaming unit 2102.

Clients and server communicate over a computer network 2150. Typically, they are on separate computers, however, in some embodiments both client and server may reside on the same computer, without the need of network. The network 2150 may consist of any network that enables communication between or among systems, machines, repositories, and devices (e.g., between the server 2140 and the clients 2120-2130). Accordingly, the network 2150 may include one or more portions that constitute a private network, a public network (e.g., the Internet), or any suitable combination thereof. Accordingly, network may include one or more portions that incorporate a local area network (LAN), a wide area network (WAN), the Internet, a mobile telephone network (e.g., a cellular network), a wired telephone network (e.g., a plain old telephone service (POTS) network), a wireless data network (e.g., a Wi-Fi network or WiMAX network), or any suitable combination thereof. Any one or more portions of network 2150 may communicate information via a transmission medium. As used herein, "transmission medium" refers to any intangible (e.g., transitory) medium that can communicate instructions for execution by a machine and includes digital or analog communication signals or other intangible media to facilitate communication of such software.

The play client devices 2120, 2130 may comprise computing devices such as, but not limited to, personal or desktop computers, laptops, notebooks, handheld devices such as smartphones, tablets, gaming consoles and/or any other computing platform known to persons of ordinary skills in the art. Mobile device (smartphone) is a portable device that combines mobile telephone and computing functions into one unit. They are distinguished from feature phones by their stronger hardware capabilities and extensive mobile operating systems, which facilitate wider software, Internet (incl. WEB browsing over mobile broadband), and multimedia functionality (including music, video, cameras, AR, and gaming). All smartphones use GNSS for location (GNSS refers to a variety of satellite systems used across the globe), enabling accuracy. However, in some cases, a smartphone may be replaced or assisted by a tablet computer, a vehicle computer, or a wearable device.

The workstations 2151-2152 are application development clients. A workstation is a special computer designed for technical or scientific applications. Intended primarily to be used by a single user, they are commonly connected to the network 2150 and run multi-user operating systems. The term workstation has been used loosely to refer to everything from a mainframe computer terminal to a PC connected to a network.

The components of the development sub-system comprise the server 2140, the network 2150, and development workstations 2151-2152. The server 2140 consists of a Database 2142, Game development tools 2143 and AI agent and training data 2144, and the digital gaming application 2145.

The components of the play sub-system, comprise the physical gaming unit 2101, the digital gaming application 2145, the play clients 2120 and 2130, and the interconnecting network 2150. This is a server version where the digital application resides in the server and communicates with the digital play units through the network. In a particular embodiment, an autonomous play sub-system version is detached from the server, having the gaming application 2225 and 2235 running locally on digital play units 2220 and 2230, respectively, as shown in FIG. 2b.

The game is played in two cycles, physical and digital. Firstly, the physical cycle is a construction 2113 of plastic, wooden, metal or other element bricks 2112 built by the player 2111. One or more players can take part in this physical cycle. No digital technology is involved in this stage. The brick construction creates a playground for digital gaming. Once the physical model is completed, the digital game proceeds on the playground laid by the physical model. The digital game may be played by one or more players, driven by play clients such as 2120 and 2130. The player, e.g., 2121, is equipped with VR glasses 2123 and a steering joystick 2124 (or other interactive control means), interconnected by a mobile computing device 2122 to the gaming application. Alternatively, the player 2111 can use the display and the keyboard of mobile device 2122 for visualization and gaming controls.

Further, when played with a highly capable mobile computing device, copies of the gaming applications 2225 and 2235 can run autonomously at each of the mobile computing devices 2222 and 2232 (as shown in FIG. 2b), detached from the server. In multi-gamer cases, each play unit 2220 and 2230, is driven by its own mobile device 2222 and 2232, respectively., The mobile devices 2222 and 2232 may mutually communicate by using the network 2250 for synchronization and coordination. Although only two play units 2120 and 2130 are illustrated in FIG. 2a, any number of units can be used.

The physical part of the IR gaming application is developed as a kit of plastic interlocking bricks 2112, including all the parts needed to complete the model 2113, as well as the printed instructions 2114. The kit of the physical gaming unit can be either purchased as an off-the-shelf product or developed as a custom architectural model. For instance, LEGO®, the leading brick producer, provides a MOC (stands for "My Own Creation") which are custom creations that may be designed and built by LEGO® fans. They are using original LEGO® sets, but for custom models. A BuildaMOC kit includes all the LEGO® parts needed to complete a MOC, as well as the printed instructions or PDF files, which is incorporated hereby by reference. Typically, the construction's interior is designed by the game developer with the assistance of AI, as part of the digital game development. Nevertheless, in some embodiments the player himself may design the construction's interior, later incorporated into digital development.

Server 2140 of the digital gaming unit 2102, may be used in the creation, development, testing, and updating of an IR gaming application, as well as in running the IR gaming application in conjunction with the Digital Gaming Systems 2120-2130. For development purposes Server 2140 consists of Database 2142, Game Development Tools 2143, AI Algorithms and Training Data 2144, and Digital Gaming Application 2145.

As used herein, a "database" 2142 is a resource to store data structured in any format, including a text file, a multimedia file, a gaming file, a table, a spreadsheet, a relational database (e.g., an object-relational database), a triple store, a hierarchical data store, or any suitable combination thereof. It is a resource to store all the Gaming Contents, of the various media (videos or still images, or other multimedia elements such as XR, sound effects, music, narration, text, etc.), required for the game or the gamified application. Alternatively, part of the contents can be reached online from the WEB via network 2150. The database, as described in greater detail in conjunction with FIG. 3b, comprises lists of physical models, raw digital games, complete IR gaming applications, and AI training data and prediction functions.

Game Development Tools 2143 are organized in four levels. AI Agent and Training Data 2144 are involved in creating or reproducing VR exterior, internal spaces, and interior design of the gaming environment; the above are described in greater detail in conjunction with FIGS. 3a and 3b. IR Gaming Application 2145, the result of game development, delivers a virtual reality photo-realistic view of the exterior and interior of the plastic brick architectural model, and a digital gaming part of the IR gamified application.

Reference is now made to FIG. 3a, presenting the process of developing the digital part of an IR game. A complete IR game consists of a physical reality toy-sized construction 311 and virtual reality gamified application 318. The toy sized construction 311 is typically of an architectural character. It is chosen to serve best the objectives of gamified applications.

A raw gamified application 312 is a prototype of the digital gamified application 318. Its requirements are compared with the capabilities of the toy-sized construction 311. Such needs may include proper gaming environment (e.g., a building, airplane, ship, car, indoor/outdoor, etc.), shape, size, special characteristics, etc. The physical toy construction 311, built of plastic bricks, carries attributes that may or may not satisfy these needs. If satisfied, the construction 311 undergoes appropriate transformation such as creating a photorealistic VR exterior 313, division of the internal space 314, and interior design 315. The raw gamified application 312 is then mapped on the VR transformed construction and game assets 317 (images, videos, riddles and clues, sound, music, animation, etc.) are appended, creating the gaming environment 316 for the complete digital gamified application 318. Reference is now made to FIG. 3b, presenting the development platform 3250 for the digital part of IR games, according to embodiments of the current invention.

The physical model construction typically consists of a full exterior, but it lacks an interior, which must be worked out. Such an interior may be taken from real life (e.g., Michael Angelo's frescoes for a model of the Sistine Chapel, see example case 3) or can be designed from scratch. For design, the game development platform is assisted by Artificial Intelligence. Besides creating a real-looking and real-size VR exterior, it further divides the internal space to sub-spaces and designs the interior according to the game requirements (e.g., number of floors, style, atmosphere, etc.). Some of the internal spaces may consist of imaginative outdoor or open space. The created interior serves as a playground for the digital game.

The game development platform 3250 includes Game Development Tools 3240, Database 3230, and AI agent 3220.

Database 3230 consists of three lists 3231-3233, and AI prediction functions 3234-3236. The list 3231 includes a full definition of constructions including a list of physical models+VR exteriors or raw digital games 3232. Training Data and Prediction Functions 3234-3236 serve AI algorithms for designing the exterior, the internal (closed and/or open) spaces, and interior design. Prediction functions are a result of processing the training data by AI algorithms.

Physical models+VR Exteriors 3231 holds a list of physical models (constructions), each such entry holds a VR exterior as well. For new development of an IR game, the digital part of the game may be based on one of the already existing models in the list, or on a new model. Each new construction is first added to the list and then VR exterior is developed and appended to the same entry. In some embodiments of the present invention, machine-learning is utilized for creating a photorealistic exterior out of brick-based models.

List of raw digital games 3232, holds games that had been paired before with models and developed for a full IR Game Application (now an entry in the Pool of Complete IR Game Applications 3233). The same raw game may be paired anytime with different models for another IR Gamified Application. Also, a new raw digital game may be added to list 3232 and paired with new or existing model for a new IR game application.

The Pool of Complete IR Game Applications 3233 holds ready-to-play games. The player may start playing the digital part of an IR gamified application upon concluding the related brick construction.

AI is utilized for creating photorealistic exterior out of brick-based models. In some embodiments the constructions may be represented by a set of photographs. AI may also be applied for creating internal spaces in the constructions, such as rooms, passages, stairs, outdoor imaginary spaces, out of window views, etc., and for generating interior design of internal spaces under the raw-game constraints. According to some of the embodiments of the current invention, some basic development tasks may be solved by the agent of Artificial Intelligence 3220: creating or reproducing VR exterior, creating or reproducing VR internal spaces, and creating or reproducing a VR interior design. These AI tasks need training data 3234-3236, correspondingly consisting of a large set of training examples. The AI algorithms learn a function that is used to predict the output (exterior, internal spaces, interior) associated with new plastic-brick construction inputs. Once prediction functions are achieved based on the training data, they are also stored as training data 3234-3236 and utilized in the development process for multiple games. Prediction functions are used to generate or reproduce the exterior, internal spaces, and interior design, associated with new plastic-brick construction inputs. Prediction functions are achieved in an early, separate stage, based on the training data. In machine learning, a prediction function is a linear combination function of a set of coefficients and independent variables, whose value is used to predict the outcome of a dependent variable. The results are stored 3234-3236 (respectively) and are utilized for developing a plurality of IR games.

The game development tools 3240 are intended to develop the digital part of an IR gamified application from a match between a physical model and a raw digital game. They are constructed in four levels. The setup level 3221 enters the toy construction and the raw game name, definition, and parameters 3241. Then a feasibility study 3242 checks for match of the paired model/raw game.

The second level 3222 generates exterior and internal spaces. For a VR appearance, the exterior must be realistically reconstructed 3243, modelled after the toy-sized construction. The newly created VR exterior is appended to the construction entry in the List of Physical Models+VR Exteriors 3231. A VR exterior may suffice for virtual games played outdoors, but when the game is intended to be played inside, internal architectural spaces must be created 3244. These spaces must comply with the requirements of the raw digital game.

The interior level 3223 creates an interior design and maps the raw game onto it. The interior design of internal spaces 3245 comprises furnishing and decorating according to the game's requirements. Since we are dealing with VR, it is possible to include a view of an open landscape in the interior (as exemplified further in the second example case). Next, the raw game is mapped 3246 upon the newly created playground.

The last level 3224 finalizes the game, such as implanting different assets required by the game. The assets are game specific and may contain different objects for the game, scenery and landscape viewed from the windows, videos, riddles and clues, video games, and additional items. They may be brought in by the developer, rather than kept in the database. The complete IR gamified application 3248 is ready for use, either located in server 2140 (FIG. 2*a*) and communicating with play clients 2120, 2130 via network 2150, or downloaded to the autonomous play units 2220, 2230 (FIG. 2*b*). It is also added to the pool of IR games 3233 (FIG. 3*b*) in the database.

Reference now is made to flowchart of FIG. 4, presenting the process of developing a new IR game utilizing the Game Development Tools. The physical models may carry attributes like title, dimensions, number of floors, special characteristics, etc. and a series of photos are inputted 400. These photos and attributes are used to convert the toy sized construction into a faithful photo-realistic and a real size VR exterior. The construction is checked 401 with the List of Physical Models+VR Exteriors 3231 in database. If the construction was previously used for one of the IR game applications, then the exterior is already on the list, no need to recreate it. It is marked as "predesigned exterior" 402. Otherwise, the model data is entered 409.

The raw game requirements consist of proper gaming environment (e.g., a building, airplane, ship, car, indoor/outdoor, etc.), shape, size, special characteristics, title, and assets (special objects, riddles, narratives, videos, clues, images, etc.). When a raw gamified application is entered 403, it is checked 404 on the list 3232 of raw digital games. If not on the list, the gamified application is added to the list of raw games 405. Then a match between game requirements and construction's capabilities is tested 406 and a feasibility check 407 is done. E.g., the game requires a building with 4 floors, but the construction is only a flat hut, then the construction and the raw game do not match. If no feasibility is found, a warning to the developer is issued, another raw game or construction model may be suggested, the raw game or construction model may be modified, or the development stops 408.

In case the construction has been marked as "predesigned exterior" 410, the exterior is retrieved 411 from List of Physical Models+VR Exteriors (3231). Otherwise, a new virtual reality exterior must be created 412. It may be created either manually, or by AI algorithm 3220 utilizing a prediction function 3234 and a series of construction photographs. The prediction function 3234 predicts a desired output associated with new inputs. A VR exterior is correctly determined for new plastic-brick construction input. The exterior's image becomes a faithful to reality replica of the model, eliminating the plastic look and the jugged effect of plastic bricks, which are replaced by a real size building, covered by realistic textures (wall plaster, building bricks, marble, wood, glass, etc.). The newly generated VR exterior 412, along with the plastic-brick construction are stored 413 in the database 3230, in the List of Physical Models+VR Exteriors (3231). The same exterior can serve later for development of more digital games, possibly with different game needs of internal spacing and interior design.

The following presents three exemplary IR gamified applications.

Case #1. Game Scavenger Hunt

Background. The first example comprises developing and playing an IR indoor game Scavenger Hunt (or Treasure Hunt), played by one or more players. Hunt Games are a popular gaming category, not necessarily for educational purposes. The first stage of physical reality comprises building a plastic-brick construction of a Hut, the second is a digital reality stage of searching "inside" an imaginary VR interior for hidden objects. The game developer implants hidden items in the VR space. Participation rules may allow individuals or groups to participate, when the goal is to be the first to complete the list of hidden items.

Needs. The game's needs must be satisfied by the construction qualities. Specifically, the Scavenger Hunt game needs a single floor and a single room, flexible placement of windows and doors, and some furniture to provide enough hiding places for hidden objects. The plastic-brick structure, a flat, one store hut FIG. 5*b*, having one door and three windows, and enough internal space, satisfies the game's needs.

Game developing. We assume a debut appearance of the model and the game. The "Hut" construction and its properties are not found on the existing model list, so it is added to the list. The next step is looking up the list of raw games for Treasure Hunt game. If not found, its data is saved on the list. Now the match between the model capabilities and the game requirements is examined. Since the prerequisite of a single floor is matched by the model, the VR based hut exterior FIG. 5*c* is reconstructed. If the reconstruction is done by AI, rather than manually, the AI agent may utilize photos taken from around the model. For manual reconstruction the photos may be used as well, along with directly viewing the plastic-brick construction. The newly generated VR exterior is saved on the List of Physical Models+VR Exteriors 3231 in database 3230.

The AI generated internal space is based on the prediction function. The single floor, amount of space, and placement of windows and doors of the construction are taken as an input. Then, the resulting internal space undergoes interior design by the AI agent, creating the right outlook and enough hiding places for the assets. The assets for the treasure hunt game may include riddles, clues, small toys and balls, photographs, playing cards, candies etc. They are implanted within the designed interior, and the gaming application is finalized. Upon completion, the game is saved in the "Pool of complete IR game applications" 3233, ready for play.

For the player (or multiple players) the gaming starts when the player builds a plastic-brick hut FIG. 5*b*, out of plastic bricks FIG. 5*a*, assisted by printed instructions. Then with the aid of a VR headset, gaming controls and steering joystick, or alternatively, with a mobile device display and keyboard, the player can see the hut in a real size and look FIG. 5*c*. Now the player sets off to hunt for his booty, implanted in the internal space. The players are given a time limit to complete all items. In the multiple players case, the player who is the first to find everything on his list or the one to find the most objects in the time allotted is the winner. Upon running out of time, the VR disappears, returning to full reality.

Case #2. Educational Gamified Application—Children Literature at a Public Library Background. The use of educational games as learning tools is a promising approach due to their ability to teach and reinforce knowledge and important skills such as problem-solving, collaboration, and communication. Literature gamified applications offer a chance to expand a child's imagination and understanding of the world. Libraries play an essential role by providing access to children's literature resources. So, the importance of libraries should be internalized by all children. Learning library skills (information and digital literacy) which are fundamental for students at all levels. Such skills enable them to find a book in the library, providing the children with independence and the ability to find their way around the stacks. This exemplary case helps to effectively develop three core skills: (1) a teamwork construction of a library model, (2) learning library skills, and (3) "inside" the library evaluating a book with a critical eye for content.

Book evaluation in our example may be combined with book reports assigned by the teacher, helping students retain and analyze the information from their assigned readings. What is the basic plot, and how does it contribute to life? What are the themes expressed throughout? What are the most distinguished words, scenes, or messages?

The first, physical reality task, is building a plastic-brick construction of a public library, in which several students may collaborate as a team. The importance and weight of libraries in community life is communicated to students through the physical effort of building with their own hands. An exemplary library model is shown in FIG. 6a, which is a LEGO® replica of the Camden Public Library, in Maine. FIG. 6b shows a photograph of the real building. Such a large structure may suit well the collaborative work of several students.

The next two stages are digital, played individually by each student. Upon wearing VR glasses, the student is virtually located inside the library building.

The second stage is learning and exercising library skills by making use of digital and non-digital information. The search utilities are in the entrance hall of the library. The student searches for a specific book, the one to be evaluated in the next stage. The search stretches from the digital and non-digital information up to the bookshelf in the main hall.

The third stage is evaluating *The Little Prince*, a novella written and illustrated by French writer and military pilot Antoine de Saint-Exupéry. The story follows a young prince who visits various planets, including Earth, addressing themes of loneliness, friendship, love, and loss. Despite its style as a children's book, The Little Prince makes observations about life, adults, and human nature. The educational gamified application approach to this novella stimulates thinking and imagining, improving reader's engagement and motivation.

Needs. A kit of plastic bricks is needed for construction of the library model supplemented by printed directions, VR library exterior and interior (either reconstructed from the real building or made up) including the entrance hall, the main hall, and two side rooms. The required assets comprise narration, figures and images from the novelle, set of questions, riddles, and hints.

Playing the IR gamified application. During the physical reality stage, a public library is being constructed FIG. 6a by one or more players. The importance and weight of libraries is communicated to children through the physical effort of a building experience. Upon completing the construction, each player puts on a VR headset to have a glance at the VR library exterior and then enter the entrance hall. In this specific case of the Camden Public Library, when a real library building exists FIG. 6b, the VR exterior looks very much like the photo. In contrast to the collaborative build in the physical reality stage, in the digital stage each of the students may play alone or as part of a group yet having an isolated experience. When played competitively, individual players may play simultaneously (each player has the entire VR space for his sole disposition), or sequentially measuring the time. The player who answers the best in the shortest time wins the competitive game.

Upon finding and "touching" the book on a bookshelf, the player is guided to a side room with a signboard "The Little Prince by Antoine de Saint-Exupéry". While opening the door, an extensive virtual reality view opens up, with a landscape of the Sahara Desert, and a crashed airplane in the foreground. Above, some of the book's characters on their planets are crossing the sky, such as: the little prince, his rose and volcano FIG. 6c, the old King FIG. 6d, and the lamplighter FIG. 6e. An additional important character is the fox FIG. 6f, which lives on the Earth, and therefore is located on the desert soil. Each such character appearance teaches a specific theme of the story by way of animation and narration (e.g., narration by Kenneth Branagh, which is incorporated hereby by reference). This part of the educational gamified application helps the kids to learn life lessons from the Little Prince. A test of these taught themes will take place in the next room to which the player is farther conducted. The next room's interior may be designed as the writer's working space FIG. 6g. Here the preceding narrative part is concluded by solving riddles and clues. Their difficulty can be adjusted to the age of the players, with obvious clues for the younger hunters and tricker ones for experienced explorers. A series of queries (in the form of written notes) are being planted next to or inside different objects scattered across the room, such as the shelves, books, drawers, etc. Each one contains a query relating to one of the previously narrated standpoints. Also clues to the solution can be encoded in the objects around. The challenge presented by the clues themselves raises fun. It is up to the player to decode these riddles clues and deliver a winning answer to questions. Here are some examples.

What does the rose symbolize? (The human characteristics of vanity, insecurity, pridefulness, sensitivity, naivety, and entitlement)

What does the fox represent? (The fox symbolizes the importance and at times the necessity of human connections)

Why is the king important in the little prince? (The king symbolizes rulers who make a big deal about the power they have, but who are pretty ineffective at enforcing their power)

Who is the lighter in the little prince? (The lamplighter is a faithful but unhappy grownup, who is miserable because his job allows him no rest. His planet makes a full turn every minute, and to keep up, he is constantly lighting or putting out the lamp)

Conclusion. This educative exemplary case of a gamified application helps to effectively develop three skills: raise the children's awareness of libraries by physically building a library model, exercising library skills, and helping them to evaluate a book with a critical eye for content.

Yet, the physical stage of constructing a library can also serve other educational gamified applications with different digital reality stages, such as searching and evaluating many other books.

Case #3. Educational Gamified Application—the Sistine Chapel

Background. Yet another category of Integrated Reality Gamified Applications emphasizes the educational potential of familiarizing the school students with the world's temples of art, culture, and knowledge. On top of exploration and intimate familiarity with the temple by constructing its exterior out of plastic bricks, the student is exposed to a breathtaking interior, having the opportunity to face it closely (by VR means) and grasp knowledge.

This exemplary case helps a student, at any place on Earth, to discover the Sistine Chapel in Rome, Italy, with its immortal art by Raphael, Michelangelo, Perugino, Botticelli, and other great Renaissance artists. From the historical and cultural point of view, the decorative scheme displays a consistent iconographical pattern of the two Biblical Testaments merged.

Developing the IR educational gamified application. The intermixed worlds of physical reality and digital reality join forces for the educational goal of achieving a great learning advantage by applying the Integrated Reality approach of the present invention, stimulating learning, thinking, engagement and motivation of the students for the study of the Renaissance art, culture and history. The kit of the Sistine Chapel can be either purchased or developed as a custom architectural model via LEGO®'s MOC (stands for "My Own Creation"). The kit includes all the LEGO® parts needed, as well as the printed instructions (FIG. 7b). The VR exterior, internal spaces, and the interior are reproduced from photographs of the real place, assisted by AR, if necessary. Many educational games, for singles or groups, may be implemented on the Sistine Chapel playground: historical, biblical, art history, religious, etc.

Playing the educational IR gamified application. The Chapel model may be physically constructed out of plastic bricks by one or more players, as shown in FIG. 7b. The VR exterior looks similar to the photograph shown in FIG. 7a.

Thereafter, comes the digital stage. The student may virtually enter the Chapel (by wearing VR glasses) and face the magnificent interior of art-covered walls and ceiling.

The walls were painted by different Renaissance masters FIG. 7c. The southern wall is decorated with the Stories of Moses, the northern wall houses the Stories of Jesus, and the Eastern wall is decorated by the stories of Christ and Moses.

The ceiling is covered with Michelangelo's frescoes, including more than 300 figures FIG. 7d.

These frescoes are among the most important paintings in the world. Nine main scenes dominate, depicting stories about the creation, fall, and rebirth of mankind. These stories are from the Book of Genesis, the first book in the Bible. The most important scenes, from the standpoint of iconography—are the Creation of Adam FIG. 7e, Creation of Eve FIG. 7f, and The Fall and Expulsion from the Garden of Eden FIG. 7g. Various educational and touristic gamified contents may be developed based on the interior visuals of the Sistine Chapel, and played again and again by different ages, groups, nationalities, etc.

Conclusion. Similar methods of Integrated Reality gamification can be applied not just on the Sistine Chapel, but also on other world's centers of art, culture, and knowledge, making the method suitable not only for educational but also for touristic and other purposes.

The integration of physical and digital realities brings important benefits from both worlds to the player. On the one hand, constructing a real structure develops visual-spatial ability, improves hand and eye coordination, and trains the eyes and hands. On the other hand, digital reality enhances engagement, knowledge retention, learning outcomes, teamwork, social skills, and empathy.

FIG. 8 illustrates an exemplary system 800 for implementing various aspects of the invention. System 800 includes a data processor 802, a system memory 804, and a system bus 816. The system bus 816 couples the system components including, but not limited to, the system memory 804 to the data processor 802. The data processor 802 can include one or more of any of the various available processors. The data processor 802 refers to any integrated circuit or other electronic devices (or collection of devices) capable of operating on at least one instruction, including, without limitation, Reduced Instruction Set Core (RISC) processors, CISC microprocessors, Microcontroller Units (MCUs), CISC-based Central Processing Units (CPUs), Digital Signal Processors (DSPs), Graphics processing unit (GPU), and General-purpose graphics processing unit (GPGPU). Furthermore, various functional aspects of the data processor 802 may be implemented solely as software or firmware associated with the processor. Dual microprocessors and other multiprocessor architectures also can be employed as the data processor 802.

The system bus 816 can be any of several types of bus structure(s) including the memory bus or memory controller, a peripheral bus or external bus, and/or a local bus using any variety of available bus architectures known to those of ordinary skill in the art.

The system memory 804 may include computer-readable storage media comprising volatile memory and nonvolatile memory. The non-volatile memory stores the basic input/output system (BIOS), containing the basic routines to transfer information between elements within the system 800. Nonvolatile memory can include but is not limited to, read-only memory (ROM), programmable ROM (PROM), electrically programmable ROM (EPROM), electrically erasable programmable ROM (EEPROM), or flash memory. The volatile memory includes random access memory (RAM), which acts as external cache memory. RAM is available in many forms such as static RAM (SRAM), dynamic RAM (DRAM), synchronous DRAM (SDRAM), double data rate SDRAM (DDR SDRAM), enhanced SDRAM (SDRAM), SYNCHLINK™ DRAM (SLDRAM), RAMBUS© direct RAM (RDRAM), direct RAMBUS® dynamic RAM (DRDRAM), and RAMBUS® dynamic RAM (RDRAM).

The system memory 804 includes an operating system 806 which performs the functionality of managing the system 800 resources, establishing user interfaces, and executing and providing services for applications software. System applications 808, modules 810, and data 812 provide various functionalities to system 800.

System 800 also includes disk storage 814. Disk storage 814 includes, but is not limited to, devices like a magnetic disk drive, floppy disk drive, tape drive, Jaz drive, Zip drive, LS-100 drive, flash memory card, or memory stick. In addition, disk storage 814 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). A user enters commands or information into system 800 through input device (s) 824. Input devices 824 include, but are not limited to, a pointing device (such as a mouse, trackball, stylus, or the like), a keyboard, a microphone, a joystick, a satellite dish, a scanner, a TV tuner card, a digital camera, a digital video camera, a web camera, and/or the like. The input device 824 connects to the data processor 802 through the system bus 816 via interface port(s) 822. Interface port(s) 822 include, for example, a serial port, a parallel port, a game port, and a universal serial bus (USB).

The output devices 820 like monitors, speakers, and printers are used to provide the output of the data processor 802 to the user. Another example is a USB port that may be used as an input device 824 to provide input to system 800 and output information from system 800 to output device 820. The output device 820 connects to the data processor 802 through the system bus 816 via output adaptor 818. The output adapters 832 may include, for example, video and sound cards that provide a means of connection between the output device 820 and the system bus 816.

System 800 can communicate with remote communication devices 828 for exchanging information. The remote communication device 828 can be a personal computer, a server, a router, a network PC, a workstation, a microprocessor-based appliance, a mobile phone, a peer device, or another common network node and the like.

Network interface 826 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring, and the like. WAN technologies include, but are not limited to, point-to-point links, circuit switching networks like Integrated Services Digital Networks (ISDN) and variations thereon, packet switching networks, and Digital Subscriber Lines.

The invention claimed is:

1. A method for creating an integrated reality gamified application that integrates physical reality and virtual reality, to be played by one or more players, the method comprising:
   providing a physical architectural model constructed of interlocking plastic bricks, having a jagged look of interlocking components, to be used as a prototype for a virtual reality gamified application; and
   developing a digital reality gamified application to be played in virtual reality environment, wherein the development process comprising levels of:
      checking for a match between the physical architectural model and a raw gamified application;
      creating or reproducing an exterior having a real, non interlocking components look;
         wherein:
            the reproducing is based on photographs of the physical architectural model;
      creating or reproducing internal spaces and interior design of a real, a non interlocking component look;
      mapping a selected raw gamified application with the created or reproduced internal spaces and interior design; and
      finalizing the creation of integrated reality gamified application by appending one or more game assets;
   wherein:
      all the development levels of gamified application are configured for creating virtual reality environment.

2. The method of claim 1, wherein providing the physical architectural model comprises a kit of interlocking plastic brick components, serving as a model for a gaming environment of the integrated reality gamified application.

3. The method of claim 2, wherein building the physical architectural model using printed instructions or PDF files.

4. The method of claim 1, wherein the appended game assets, including one or more of images, videos, riddles and clues, sound, music and animation that become integrated into virtual reality.

5. The method of claim 1 further comprising issuing a warning to the developer if the characteristics of the physical architectural model do not match with the raw gamified applications.

6. The method of claim 1, wherein the virtual reality exterior is created using a set of attributes of the physical architectural model.

7. The method of claim 1 further comprises storing the created virtual reality gamified application in a database of complete integrated reality game applications.

8. A system for developing an integrated reality gamified application that integrates physical reality and virtual reality, to be played by one or more players, the system comprising:
   a kit of interlocking plastic bricks for construction of physical architectural model constructed of interlocking plastic bricks, having a jagged look of interlocking components, to be used as an architectural prototype for developing an enhanced virtual reality environment; and
   a computing device configured for development of virtual reality gamified application based on the architectural model, the computing device comprises:
      a digital database, wherein the database comprises one or more of:
         a list of physical models and virtual reality exteriors;
         a list of raw digital games;
         data for designing an_exterior, internal spaces, and interior design; and
         a pool of complet virtual reality game applications, as previously created and stored by the development system;
      digital game development tools, wherein the game development tools are configured for development of virtual reality games based on the physical architectural model;
   wherein:
      the game development tools are configured for creating a virtual reality gaming environment; and for creating an integrated reality gamified application played in said virtual reality gaming environment.

9. The system of claim 8, wherein the kit further comprises printed instructions or PDF files which may assist in the construction of the physical architectural model.

10. The system of claim 8, wherein the computing device used for developing an integrated reality gamified application comprises one or more of a personal computer, a server, a router, a network PC, a workstation, a microprocessor-based appliance, an IoT appliance, or a common network node.

11. The system of claim 8, wherein the digital game development tools are configured in four levels to create the virtual reality gamified application by:
   entering name, definition, and parameters of a physical construction and of a raw game and checking for a reciprocal match;
   creating or reproducing a virtual reality exterior of a real, a non interlocking component look;
   creating or reproducing the internal spaces and interior design according to virtual reality gamified application requirements;
   mapping a selected raw gamified application with the internal spaces and interior design; and
   finalizing the creation of integrated reality gamified application by appending one or more game assets, integrated into virtual reality environment.

12. The system of claim 8, further comprising issuing a warning to the developer if the characteristics of the physical architectural model do not match with the raw gamified applications.

13. The system of claim 12, wherein the digital game development tools are configured to create the new virtual reality exterior using a set of attributes and photographs of the physical architectural model.

14. The system of claim 8, wherein the pool of complete integrated reality game applications comprises ready-to-play integrated reality games.

\* \* \* \* \*